United States Patent [19]

Castiglioni

[11] 4,237,566
[45] Dec. 9, 1980

[54] HIGH SPEED MACHINE FOR COLD FORGING SCREWS, RIVETS, AND THE LIKE HARDWARE

[75] Inventor: Albino Castiglioni, Paradiso-Lugano, Switzerland

[73] Assignee: Somavis S.A., Switzerland

[21] Appl. No.: 22,307

[22] Filed: Mar. 20, 1979

[30] Foreign Application Priority Data

Mar. 24, 1978 [CH] Switzerland ............... 3190/78

[51] Int. Cl.³ ................................. B21K 1/44
[52] U.S. Cl. ......................... 10/11 R; 10/13; 10/25
[58] Field of Search .............. 10/11 R, 11 A, 11 E, 10/25, 13; 72/337, 338

[56] References Cited

U.S. PATENT DOCUMENTS

| 2,139,936 | 12/1938 | Clouse | 10/25 X |
| 3,551,926 | 7/1971 | Ferre | 10/13 |
| 3,720,968 | 3/1973 | Garlacchi | 10/11 A |
| 4,023,452 | 5/1977 | Lee | 10/13 X |
| 4,044,588 | 8/1977 | Haines | 10/11 X |

Primary Examiner—Leon Gilden
Attorney, Agent, or Firm—Lewis H. Eslinger

[57] ABSTRACT

A high speed machine for cold forging screws, rivets, and the like comprises a frame supporting a die-carrying head thereon reciprocates a punch carrying slide, shears having a fixed and a movable blade, and a bar stock shearing device including a linkage effective to transmit at least part of the movement and energy of the punch carrying slide to the movable blade and convert the reciprocating motion of the slide into a reciprocating motion of the movable blade.

6 Claims, 3 Drawing Figures

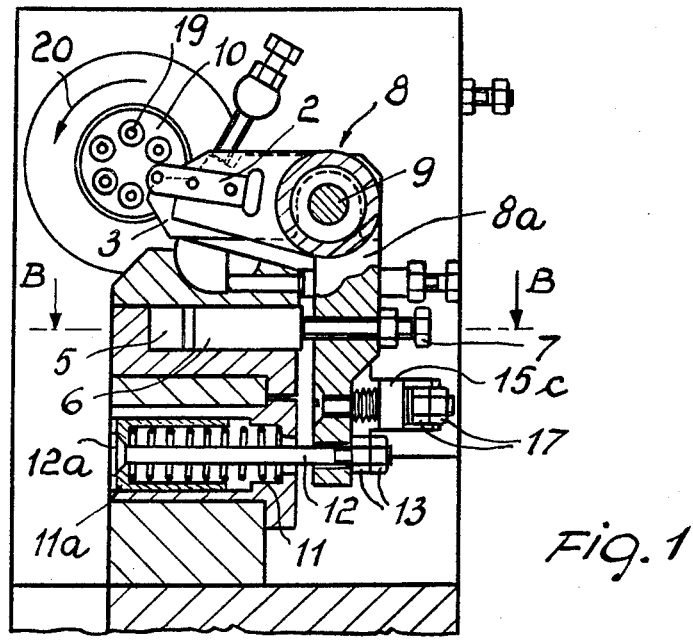
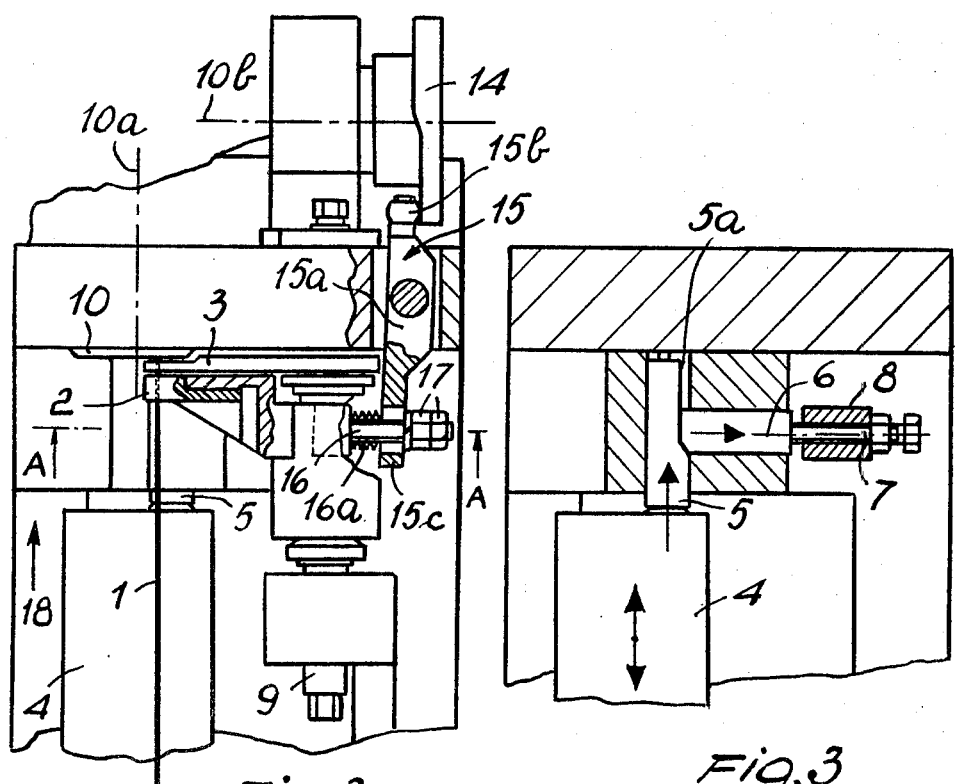

HIGH SPEED MACHINE FOR COLD FORGING SCREWS, RIVETS, AND THE LIKE HARDWARE

BACKGROUND OF THE INVENTION

This invention relates to a high speed machine for cold forging screws, rivets, and the like hardware, which incorporates a shearing device for shearing the bar stock to be worked.

Known are automatic machines for cold forging screws, rivets, etc., wherein the bar stock is fed gradually into a die carried by a step rotatable head.

The die which receives the bar stock also determines the length of the cylindrical blank to be sheared off the bar. After the bar has been inserted into the die, special shearing devices cut it to the desired length, while the die-carrying head moves through one step to bring the sheared cylindrical blank under the heading punch, which punch is carried by a heavy slide, also caused to reciprocate in synchronism with the back and forth movement of the die-carrying head.

A disadvantage of such conventional machines is their slow rate of operation, due to the high momentum of the punch-carrying slider.

In fact, prior to the shearing operation, the kinetic energy stored up in the slide has to be dissipated, thereafter the shearing can be carried out and the slide restarted, which requires a certain time, again on account of the considerable slide mass.

SUMMARY OF THE INVENTION

It is an object of this invention to radically eliminate that disadvantage, and to effectively exploit the energy stored up by inertia in the punch-carrying slide to the shearing of the rod or bar stock.

This object is achieved, according to this invention, by a high speed machine for cold forging screws, rivets, and the like hardware, comprising a frame, a die-carrying head supported for step rotational movement by said frame, a punch-carrying slide caused to reciprocate to and fro said die-carrying head, means for feeding a bar stock to said die-carrying head, shears having a fixed blade and a movable blade carried by said frame in the proximity of said die-carrying head, characterized in that it comprises a bar stock shearing device including linkage means connected at one end to said punch-carrying slide and at the other end to said movable blade for transmitting at least part of the movement and energy of said punch-carrying slide to said movable blade and converting the reciprocating motion of said slide into a reciprocating motion of said movable blade.

The machine indicated is extremely fast, and affords a substantial output increase.

BRIEF DESCRIPTION OF THE DRAWING

For further clarification of the invention, the accompanying drawing illustrates a preferred, but not limitative, embodiment of the instant machine.

In the drawing:

FIG. 1 is a cross-section elevational view of the machine taken in a plane through A—A in FIG. 2;

FIG. 2 is a plan view of the same, partly in longitudinal section; and

FIG. 3 is a detail view of the same, in longitudinal section, taken in a plane through B—B in FIG. 1.

DESCRIPTION OF THE PREFERRED EMBODIMENT

It should be pointed out that some components of the machine are known per se, thereby they are represented only schematically in the drawing.

With reference to the drawing figures, the instant machine device comprises a step rotatable die-carrying head 10, a movable shears blade 2 and a stationary or fixed one 3, a punch-carrying slide 4, and a bellcrank lever 8 for controlling the movable shears blade 2, which is pivotable about a pivot pin 9. The bar stock 1 is guided and fed in a manner known per se.

The punch-carrying slide 4, which is caused to reciprocate in a manner known per se, also carries, on its front end facing the die-carrying head 10, a wedge element 5 rigidly mounted thereto. The wedge element is formed with a cam profile 5a and is in sliding engagement with the butt end of a block element 6 arranged to slide transversally to the wedge element axis, such that a cam and follower relationship is established between the wedge and the block. The end of the block element opposite the butt end is in abutment engagement with an adjustable stop screw 7 which is threaded into a threaded bore provided in the normally substantially vertical arm of the bellcrank lever 8, level with the block element 6. The lower end of the vertical arm 8a of the bellcrank lever 8 accomodates, in a specially provided hole therein, a threaded link 12, the axial position whereof can be adjusted by means of adjusting nuts 13, and the opposite end whereof will penetrate a cavity provided in the frame structure block of the machine whereon the punch-carrying slider 4 is slidably mounted. Said cavity accomodates a spring 11, which acts, through a cap 11a partially encasing it, on the widened end 12a—remote from the end engaging the lever 8—of the link 12, and urges in an elastically yielding manner the lever 8 to open the movable blade 2 carried at the opposite end of said lever, i.e. in a clockwise direction in FIG. 1. The device further provides a rocking lever 15 for locking the bellcrank lever 8, which extends substantially perpendicular to the plane including the bellcrank lever 8 and is journalled about a pivot pin 15a carried by the machine frame. One end 15c of the lever 15 engages with the vertical arm of the bellcrank lever 8 through a link 16 and spring 16a and adjusting screws 17, while its other end carries a cam following roller 15b in sliding engagement with a disk cam 14 attached to the driveshaft of the die-carrying head 10, the axis 10b whereof extends orthogonally to the axis 10a about which the head 10 rotates.

The machine operates as follows.

As in well known per se, the bar stock 1, once straightened up and moved through the movable shears blade 2 and stationary shears blade 3, is introduced into the die of the die-carrying head 10, prearranged at the correct position for receiving it, namely aligned with it.

However, as the punch-carrying slide 4 moves forward in the direction of the arrow 18, in order to form the head portion of the screw or rivet positioned in the die 19, it applies a thrust to the camming wedge 5; the latter shifts the block 6 orthogonally, which in turn pushes on the screw 7, simultaneously causing the lever 8 to rotate in a counterclockwise direction (from the viewpoint of FIG. 1).

The lever 8, being journalled to the shaft 9, moves the movable shears blade 2 downwards. This movement results in the bar stock 1 being cut or sheared.

As the slide 4 moves backwards, the die-carrying head 10 rotates in a manner known per se through one step in the direction of the arrow 20 to bring the die, which has received the bar stock section thus sheared off, to the forging position. During its return stroke, the slide 4 allows an opposite movement of the wedge 5 and block 6, the spring 11 bringing the lever 8 back to its initial position by means of the threaded link 12 and adjusting nuts 13.

At this stage, with the movable shears blade 2 and fixed shears blade 3 having their respective passage holes for the bar stock in an axial position, the bar stock 1 is allowed to move forward and penetrate the corresponding die in the head 10, in alignment with said holes.

The die will stop, in a manner known per se, the bar stock at the correct position, which is adjustable to correspond to the desired length for the cylindrical blank which will be next cut off the bar stock.

To prevent the bar stock 1 from moving forward as the die-carrying head 10 is still rotating, a further linkage is provided which is effective to retard the return stroke movement of the lever 8.

For this purpose, to the orthogonal shaft that controls the rotation of the die-carrying head 10, the cam 14 is attached which is so shaped as to cause, at the appropriate time, by means of the lever 15, link 16 and adjusting nuts 17, the lever 8 to be witheld in the shearing position throughout the rotation cycle of the die-carrying head 10.

The bar stock shearing device described hereinabove affords the following advantages:

- use is made of the kinetic energy of the slide 4, which has a considerable mass, without resorting to additional energy sources which would slow down the high speed machine motion;
- no other high strength devices are required for the shearing operation;
- the shearing action is completed with only a short stroke of the slide, thereby the machine operation speed is increased; and
- the shears 2,3 are safely stopped upon completion of the shearing cycle, through the cam 14 and the simple lever 15, without requiring any high strength mechanism.

The shapes of the various parts may vary, and known devices may be replaced with other equivalent ones, also known, without departing from the scope of this invention.

I claim:

1. A high speed machine for cold forging screws, rivets, and the like hardware, comprising a frame, a die-carrying head supported for step rotational movement by said frame, a punch-carrying slide caused to reciprocate to and fro said die-carrying head, means for feeding a bar stock to said die-carrying head, shears having a fixed blade and a movable blade carried by said frame in the proximity of said die-carrying head, and a bar stock shearing device including linkage means secured at one end to said punch-carrying slide and secured at the other end to said movable blade for transmitting at least part of the movement and energy of said punch-carrying slide to said movable blade and converting the reciprocating motion of said slide into a reciprocating motion of said movable blade.

2. A high speed machine according to claim 1, wherein said movable blade is rigid with a bellcrank lever the pivot axis whereof extends in the direction of said slide path and is offset with respect thereto, and wherein said bellcrank lever has a first arm carrying said movable blade and a second arm set at an angle to the first, characterized in that said linkage means comprises a wedge element, said wedge element being rigid with said slide and having a camming surface oriented in a transversal direction to the path of the slide and a block cam following element in sliding contact with said camming surface with one end, and having the other end thereof in thrusting engagement with said second arm of said bellcrank lever, said block element being accomodated for sliding movement in a direction transversal to the path of said slide, a spring having one end secured to said frame, the other end of said spring urging said second arm of said bellcrank lever against said block towards said slide.

3. A high speed machine according to claim 2, characterized in that said second arm of said bellcrank lever comprises an adjustable stop screw by means whereof said block element is thrust contacted.

4. A high speed machine according to claim 2, characterized in that said second arm of said bellcrank lever comprises an adjustable threaded link whereon said spring is active.

5. A high speed machine according to claim 2, characterized in that said linkage means further comprises a locking mechanism for locking said bellcrank lever in one of the angular and end positions thereof.

6. A high speed machine according to claim 2, characterized in that said linkage means comprises a locking mechanism for locking said bellcrank lever at an end angular position thereof, said locking mechanism comprising a lever set for rocking about a pivot having its axis substantially parallel to the plane including said bellcrank lever but away therefrom, a shaft having a lobe cam rotating about an axis extending perpendicular to the axis whereabout said die-carrying head rotates, said rocking lever having one end in contact with said rotating cam and the other end provided with means for connection thereof to said second arm of said bellcrank lever, said connecting means including an adjustment screw, the lobes of said lobe cam determining the locking time interval for said bellcrank lever.

* * * * *